(12) United States Patent
Sheth et al.

(10) Patent No.: US 11,924,043 B2
(45) Date of Patent: Mar. 5, 2024

(54) ESTABLISHING TRUST RELATIONSHIPS OF IPV6 NEIGHBORS USING ATTESTATION-BASED METHODS IN IPV6 NEIGHBOR DISCOVERY

(71) Applicant: Cisco Technology, Inc., San Jose, CA (US)

(72) Inventors: Sujal Sheth, Gujarat (IN); Shwetha Subray Bhandari, Bangalore (IN); Eric Voit, Bethesda, MD (US); William F. Sulzen, Apex, NY (US); Frank Brockners, Cologne (DE)

(73) Assignee: Cisco Technology, Inc., San Jose, CA (US)

(*) Notice: Subject to any disclaimer, the term of this patent is extended or adjusted under 35 U.S.C. 154(b) by 126 days.

(21) Appl. No.: 17/517,622

(22) Filed: Nov. 2, 2021

(65) Prior Publication Data

US 2022/0060384 A1    Feb. 24, 2022

Related U.S. Application Data

(63) Continuation of application No. 16/728,323, filed on Dec. 27, 2019, now Pat. No. 11,196,634.

(60) Provisional application No. 62/830,167, filed on Apr. 5, 2019.

(51) Int. Cl.
| | |
|---|---|
| *H04L 41/12* | (2022.01) |
| *H04L 45/00* | (2022.01) |
| *H04L 45/02* | (2022.01) |
| *H04W 40/24* | (2009.01) |
| *H04W 84/18* | (2009.01) |

(52) U.S. Cl.
CPC .......... *H04L 41/12* (2013.01); *H04L 45/02* (2013.01); *H04L 45/26* (2013.01); *H04W 40/246* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 8,782,408 B2* | 7/2014 | Fielder | H04L 63/065 713/168 |
| 9,020,149 B1* | 4/2015 | Golwalkar | H04L 9/0897 380/278 |
| 2003/0216143 A1 | 11/2003 | Roese et al. | |
| 2006/0077945 A1* | 4/2006 | KethiReddy | H04L 41/12 370/449 |
| 2007/0101400 A1 | 5/2007 | Freeman et al. | |
| | | (Continued) | |

*Primary Examiner* — Ajit Patel
(74) *Attorney, Agent, or Firm* — Polsinelli P.C.

(57) ABSTRACT

Systems, methods, and computer-readable media for assessing reliability and trustworthiness of devices operating within a network. A recipient node in a network environment can receive a neighbor discovery (ND) message from an originating node in the network environment that are both implementing a neighbor discovery protocol. Trustworthiness of the originating node can be verified by identifying a level of trust of the originating node based on attestation information for the originating node included in the ND message received at the recipient node. Connectivity with the recipient node through the network environment can be managed based on the level of trust of the originating node identified from the attestation information included in the ND message.

20 Claims, 9 Drawing Sheets

(56) References Cited

U.S. PATENT DOCUMENTS

| | | | |
|---|---|---|---|
| 2008/0307516 A1* | 12/2008 | Levy-Abegnoli | H04L 63/0823 726/14 |
| 2010/0306827 A1 | 12/2010 | Esteve Balducci et al. | |
| 2012/0066320 A1 | 3/2012 | Taniuchi | |
| 2013/0318570 A1 | 11/2013 | L. et al. | |
| 2014/0215580 A1 | 7/2014 | Behringer et al. | |
| 2014/0379817 A1 | 12/2014 | Logue et al. | |
| 2017/0126647 A1 | 5/2017 | Zhang et al. | |
| 2017/0353317 A1* | 12/2017 | Liu | H04L 9/3242 |
| 2021/0160213 A1 | 5/2021 | Dees et al. | |

* cited by examiner

ESTABLISHING TRUST RELATIONSHIPS OF IPV6 NEIGHBORS USING ATTESTATION-BASED METHODS IN IPV6 NEIGHBOR DISCOVERY

CROSS-REFERENCE TO RELATED APPLICATIONS

This application is a continuation of U.S. Non-Provisional patent application Ser. No. 16/728,323, filed on Dec. 27, 2019, which claims the benefit of U.S. Provisional Patent Application No. 62/830,167, filed on Apr. 5, 2019, the full disclosures of each are incorporated herein by reference in their entireties.

TECHNICAL FIELD

The present disclosure generally relates to the field of computer networking, and more particularly to assessing reliability and trustworthiness of devices operating within a network.

BACKGROUND

Trustworthiness of a given device operating within a network may degrade from the time of its initial configuration. Active measurements may be needed to validate that a device is equivalently trustworthy to the time of its initial deployment. New technologies are adding capabilities which support the secure, real-time reporting of active trustworthiness measurements/evaluation from a remote device. Specifically, all-in-one chips have been used to implement secure boot modules, trust anchor modules, and secure Joint Test Action Group (JTAG) solutions for verifying the trustworthiness of devices. Further, tokens or metadata elements containing security measurements or security evidence have been developed for verifying the trustworthiness of devices.

Based on the results from such technologies, additional analysis and remediation methods can be invoked to reduce/mitigate the effects of attacks. For example, an Integrity Verification application based on a controller can invoke the validating specific portions of device memory. When errors are found during such a check, it allows the Integrity Verification application to implement steps in order for a device to be returned to a good state.

Such memory verification checks are expensive however and such checks by themselves imply that a device is more likely to be in a good state soon after device validation, and less likely to be in a good state just before a device validation. The result of this implication is that it should be possible to use historical and operational data to quantify and graph the likelihood of compromise for a specific device since the last device validation.

Device/Node verification is particularly relevant to nodes that utilize the Neighbor Discovery Protocol (NDP) to gather information for establishing and maintaining relationships/connections between each other in network environments. NDP is a protocol used by nodes implementing Internet Protocol version 6 (IPv6) to gather information related to establishing and maintaining connections in the network environments. Specifically, NDP replaces the address resolution protocol (ARP), as well as other different protocols in IPv4, for gathering information used in establishing and maintaining connections in IPv6. More specifically, NDP is used by nodes to perform neighbor and router discovery, duplicate address detection (DAD), and stateless address auto-configuration in network environments that implement IPv6.

Nodes communicating through NDP are subject to a variety of attacks. Further, an attack through NDP can subsequently enable more sophisticated denial-of-service (DoS) attacks and man-in-the-middle (MitM) attacks. However, there is a lack of available tools and techniques for verifying the integrity and trustworthiness of nodes communicating through NDP, e.g. for preventing attacks launched through NDP. There therefore exist needs for systems and methods of verifying the trustworthiness of nodes communicating through NDP. More specifically, there exist needs for systems and methods of verifying the trustworthiness of nodes communicating through NDP and conducting NDP-based attack mitigation if a node is identified as untrustworthy.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
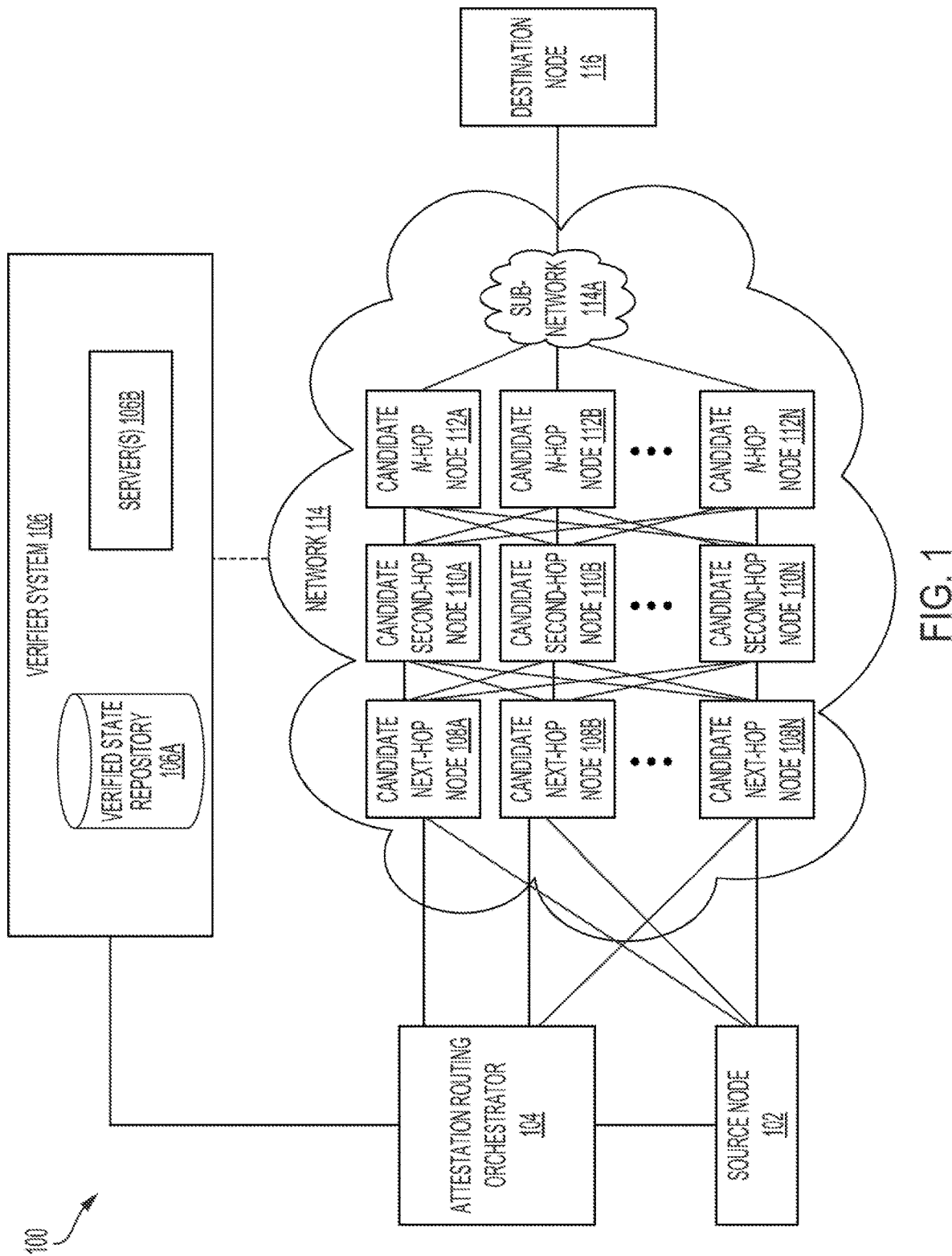
FIGS. 1 through 3 illustrate example networking environments in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods and computer-readable storage media for verifying the trustworthiness of nodes communicating through NDP.

A method can include receiving a neighbor discovery (ND) message at a recipient node in a network environment from a originating node in the network environment. Both the originating node and the recipient node can implement NDP. The method can also include verifying trustworthiness of the originating node by identifying a level of trust of the originating node based on attestation information for the originating node included in the ND message received at the recipient node. Further, the method can include managing connectivity with the recipient node through the network environment based on the level of trust of the originating node identified from the attestation information included in the ND message.

A system can include one or more processors and at least one computer-readable storage medium storing instructions which, when executed by the one or more processors, cause the one or more processors to receive a neighbor discovery (ND) message at a recipient node in a network environment from an originating node in the network environment. The originating node and the recipient node can both implement NDP. The instructions can also cause the one or more processors to verify trustworthiness of the originating node by identifying a level of trust of the originating node based on attestation information for the originating node included in the ND message received at the recipient node. Further, the instructions can cause the one or more processors to manage connectivity with the recipient node through the network environment based on the level of trust of the originating node identified from the attestation information included in the ND message. Additionally, the instructions can cause the one or more processors to disregard, by the recipient node, the ND message if the originating node is verified as untrustworthy based on the identified level of trust of the originating node.

A non-transitory computer-readable storage medium having stored therein instructions which, when executed by a processor, cause the processor to receive a neighbor discovery (ND) message at a recipient node in a network environment from an originating node in the network environment. The originating node and the recipient node can both implement NDP. The instructions can also cause the processor to verify trustworthiness of the originating node by identifying a level of trust of the originating node based on attestation information for the originating node included in the ND message received at the recipient node. Further, the instructions can cause the processor to manage connectivity with the recipient node through the network environment including manage connectivity between the recipient node and the originating node based on the level of trust of the originating node identified from the attestation information included in the ND message.

The foregoing, together with other features and embodiments, will become more apparent upon referring to the following specification, claims, and accompanying drawings.

Example Embodiments

The disclosed technology addresses the need in the art for verifying trustworthiness of NDP peers. The present technology involves system, methods, and computer-readable media for verifying the trustworthiness of nodes communicating through NDP. Further, the present technology involves systems, methods, and computer-readable media for conducting NDP-based attack mitigation based on a verified trustworthiness of a node communicating through NDP.

Figure 8:
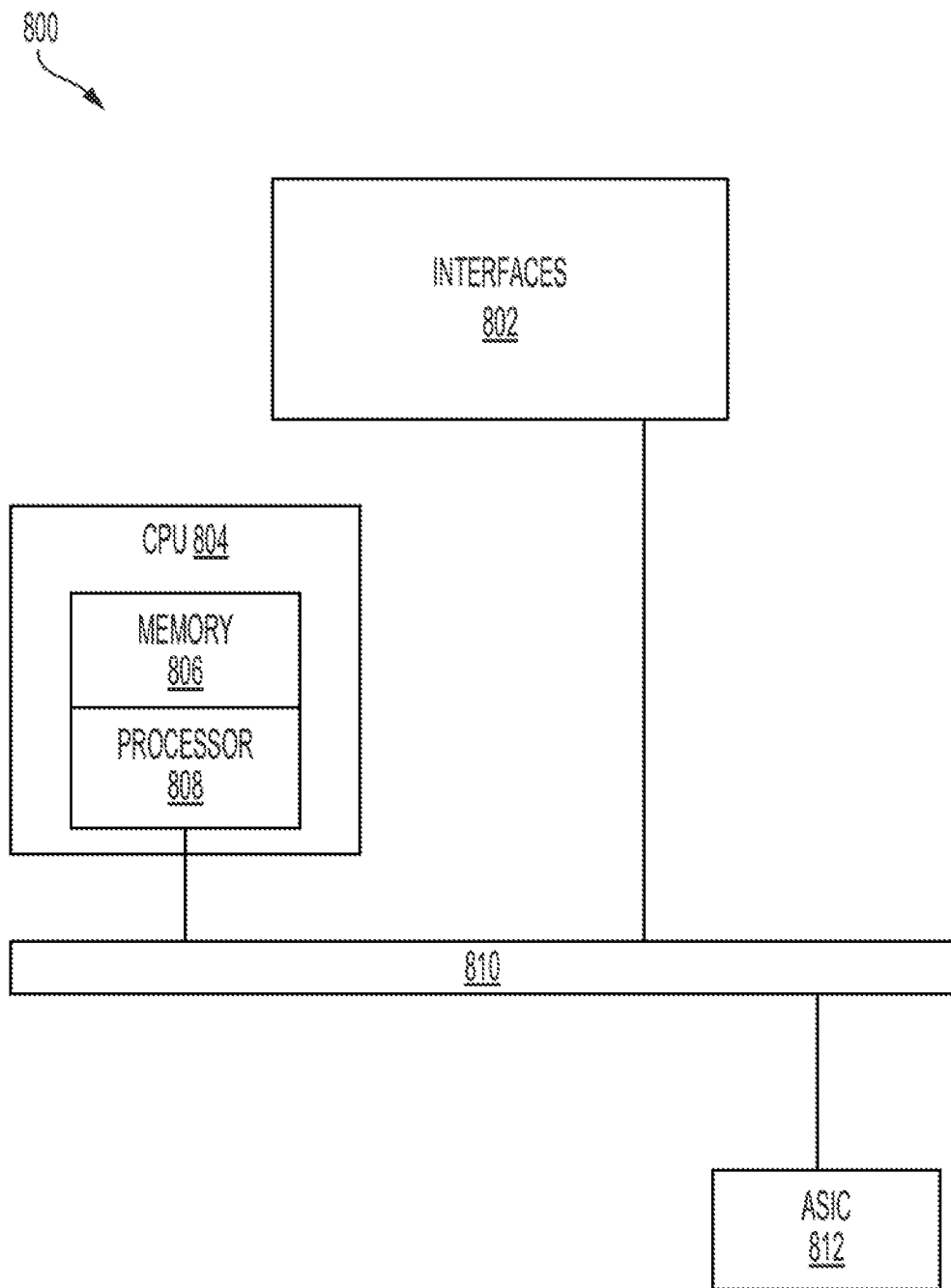
FIG. 8 illustrates an example network device in accordance with some examples.
Figure 9:
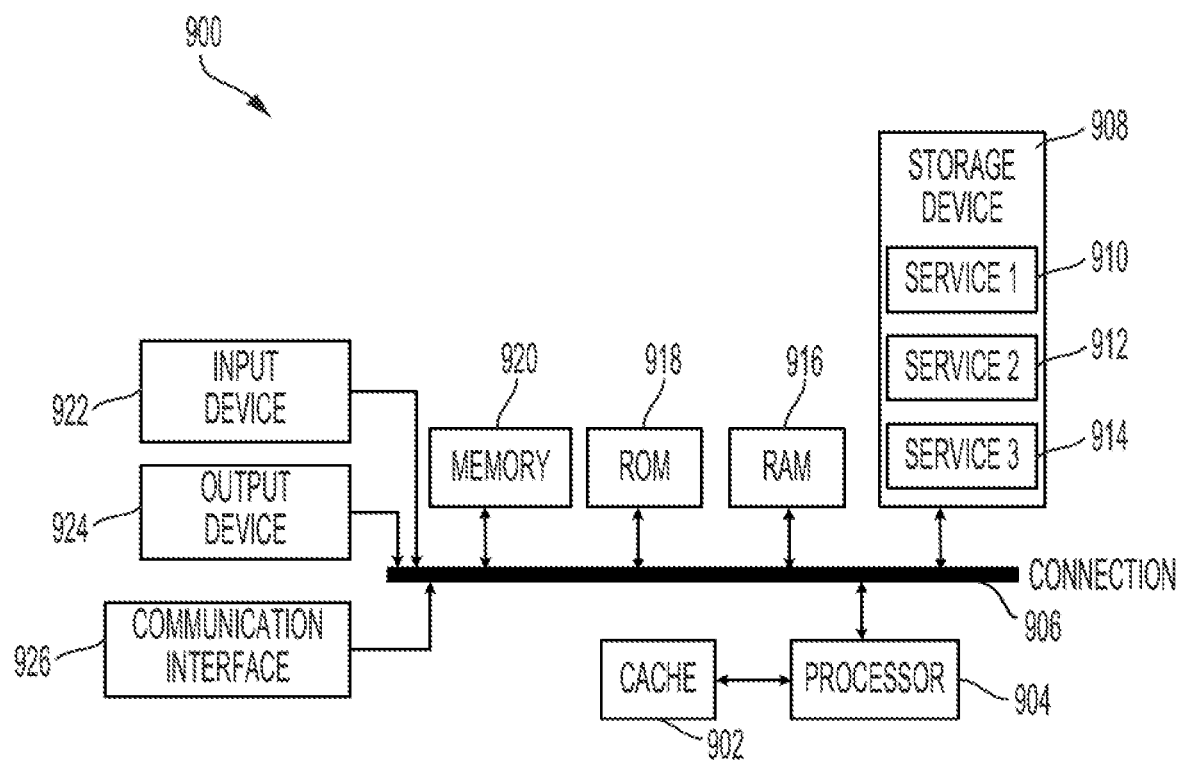
FIG. 9 illustrates an example computing device architecture in accordance with some examples.

Disclosed herein are systems, methods and computer-readable storage media for using attestation to verify trustworthiness of nodes communicating through NDP. The present technologies will be described in more detail in the following disclosure as follows. The disclosure begins with an initial discussion of systems and technologies for providing explicit verifiable proof of integrity of network nodes traversed by packets. A description of example systems, methods, and environments for providing verifiable proof of integrity of network nodes including nodes communicating through NDP, as illustrated in FIGS. 1 through 7, will then follow. The discussion concludes with a description of an example network device and an example computing device architecture, as illustrated in FIGS. 8 and 9, including example hardware components suitable for performing various networking and computing operations described herein.

The disclosure now turns to an initial discussion of example concepts and technologies for providing verifiable proof of integrity of network nodes traversed by packets.

A computer network can include different nodes (e.g., network devices, client devices, sensors, and any other computing devices) interconnected by communication links and segments for sending data between end nodes. Many types of networks are available, including, for example, local area networks (LANs), wide area networks (WANs), software-defined networks (SDNs), wireless networks, core networks, cloud networks, the Internet, etc. When data traffic is transmitted through one or more networks, the data traffic typically traverses a number of nodes that route the traffic from a source node to a destination node.

While having numerous nodes can increase network connectivity and performance, it also increases security risks as each node that a packet traverses introduces a risk of unauthorized data access and manipulation. For example, when a packet traverses a node, there is a security risk that is introduced which can result from the node being potentially compromised (e.g., hacked, manipulated, captured, etc.). As a result, compliance, security, and audit procedures can be implemented to verify that network users, devices, entities and their associated network traffic comply with specific business and/or security policies.

When sensitive information is transmitted through nodes in a network, such as in battlefield, banking settings, and healthcare settings, such traffic should be sent through uncompromised nodes to prevent access to, leakage of, or tampering with the data and sensitive information carried by that traffic. If an attacker gains access to a device via some exploit, previous protection and encryption approaches for network interfaces are generally ineffective at mitigating or addressing such unauthorized access and resulting damage.

Proving that network traffic complies with specific policies can involve proving in a secure way that the traffic has traversed a well-defined set of network nodes (e.g., firewalls, switches, routers, etc.) and that such network nodes have not been modified or compromised. This can help ensure that the network nodes have performed their expected or intended actions (e.g., packet processing, security or policy compliance verification, routing, etc.) on the packet and that the packet has traversed the network nodes.

Some security approaches can aim at removing any implied trust in the network used for connecting applications hosted on devices to cloud or enterprise hosted services. Moreover, some security approaches can be implemented to verify the trustworthiness (e.g., the integrity, identity, state, etc.) of the network and/or nodes traversed by packets. In some cases, certain verification checks can be implemented to validate or verify that traffic has traversed a specific set of nodes and that such nodes are trusted and uncompromised. In some examples, certain Proof-of-Transit (POT), Trusted Platform Module (TPM), attestation, or proof of integrity approaches can be implemented to verify or validate the trustworthiness of a node in a network.

POT can enable a network user or entity to verify whether traffic traversed a defined set of network nodes. Attestation, as further described below, can also be used to verify the integrity of a node. In some cases, the approaches herein can integrate both to offer a secure approach that allows network users or entities to verify that traffic has traversed a defined set of nodes and that such nodes have not been compromised.

In some cases, TPM can be implemented to collect and report the identity of hardware and software components in a platform to establish trust for that platform. A TPM used in a computing system can report on the hardware and software of the system in a manner that allows verification of expected behavior associated with that system and, from such expected behavior, establishment of trust. The TPM can be a system component containing state that is separate from the host system on which the TPM reports identity and/or other information. TPMs can be implemented on physical resources (indirectly or directly) of the host system.

In some examples, a TPM component can have a processor and memory such as RAM, ROM and/or flash memory. In other implementations of a TPM, a host processor can run TPM code while the processor is in a particular execution mode. Parts of system memory can be partitioned by hardware to ensure that memory used by the TPM is not accessible by the host processor unless the host processor is in the particular execution mode.

In some cases, trusted computing (TC) implementations, such as TPM, can rely on Roots of Trust. Roots of Trust can be system elements that should be trustworthy because misbehavior by such system elements may not be detectable. A set of roots can provide a minimum functionality that can sufficiently describe characteristics that affect a platform's trustworthiness. In some cases, determining if a Root of Trust is behaving properly may not be possible; however, it may be possible to determine how roots are implemented. For example, certificates can provide assurances that the root has been implemented in a way that renders it trustworthy.

To illustrate, a certificate may identify the manufacturer and evaluated assurance level (EAL) of a TPM. Such certification can provide a level of confidence in the Roots of Trust used in the TPM. Moreover, a certificate from a platform manufacturer may provide assurance that the TPM was properly installed on a system that is compliant with specific requirements so the Root of Trust provided by the platform may be trusted. Some implementations can rely on three Roots of Trust in a trusted platform, including Root of Trust for Measurement (RTM), Root of Trust for Storage (RTS), and Root of Trust for Reporting (RTR).

The RTM can send integrity information, such as integrity measurements, to the RTS. Generally, the RTM can be a processor controlled by a Core Root of Trust for Measurement (CRTM). The CRTM is the first set of instructions executed when a new chain of trust is established. When a system is reset, the processor (e.g., RTM) can execute the CRTM, which can then send values that indicate its identity to the RTS. Thus, in some cases, the starting point for a chain of trust can be established in this manner.

As previously noted, the TPM memory can be shielded from access by an entity other than the TPM. Since the TPM can be trusted to prevent unauthorized access to its memory, the TPM can act as an RTS. Moreover, the RTR can report on the contents of the RTS. An RTR report can be a digitally signed digest of the contents of one or more values in a TPM.

Attestation is another example trusted computing approach that can be used to verify the integrity of a node. Attestation can be applied to a node, such as a router or switch, to review logs from connected devices, such as Layer 1 (L1) or Layer (L2) connected devices and maintain these logs in trusted storage. These logs can be protected by embedding a private key into every trust anchor produced for a hardware device and publishing the device's public key as a certificate to adjacent devices. This peering device can then push log updates from trusted storage periodically and/or on some log entry event. Reviewing any provided signed logs can provide an understanding of the current trustable state of a peer device. Moreover, by looking back at the set of transactions which have occurred since boot time, a determination can be made regarding the trustworthiness of the information which that peer device is asserting.

In some examples, metadata elements containing security measurements or evidence, can be used to provide verifiable evidence of device trustworthiness (e.g., integrity, state, etc.). The metadata elements can include applicable data for verifying trustworthiness of a device and be provided through an applicable technique for verifying device trustworthiness. For example, the metadata elements can be provided as part of a canary stamp associated with the device. A canary stamp can indicate or otherwise include a signed measurement associated with a device for verifying trustworthiness of the device. In turn, such measurements can be referred to as canary stamps because each signed measurement is like a stamp proving its authenticity, and like a canary in a coal mine that indicates an early sign of trouble. Such verifiable evidence can be appended or included in packets transmitted by nodes on a network. The metadata elements can thus be used to evaluate the trustworthiness of a node(s) and react accordingly. For example, a device or entity can review metadata element associated with a node to determine that the node should not be trusted and adjust a network policy to mitigate possible damage.

In some implementations, dedicated cryptoprocessors, such as a processor in TPM platform, can take measurements to attest to the trustworthiness (e.g., identity, integrity, etc.) of a node and its environment (e.g., software, hardware, operating system, running binaries, firmware, etc.). These measurements include evidence that the node is in a safe state. In some cases, these measurements can be provided through canary stamps, as previously described. However, a receiver of such evidence should be able to certify that the evidence is fresh, as the evidence can become stale thereby potentially reducing its effectiveness in reflecting the current trustworthiness of a node. For example, without ensuring freshness of such evidence, an attacker has an opening to inject previously recorded measurements and asserting what is replayed as being current.

Some approaches can detect the replaying of old evidence via a "nonce". A nonce is an arbitrary number that can be used to introduce randomness. In some instances, a nonce can be used just once in a cryptographic communication. Further, a nonce can be passed into a TPM and/or incorporated into a canary stamp/metadata. In some cases, a result provided by the TPM can include a signature based on the nonce. Since the nonce can be grounded in a transactional challenge/response interaction model, in some cases the nonce may be less effective with unidirectional communications originating from an attesting device. For example, a nonce may less effective with an asynchronous push, multicast, or broadcast message.

However, there are numerous use cases where a platform assessing whether its peers are trustworthy is advantageous. Being able to perform a unidirectional attestation using an asynchronous push, multicast, or broadcast message in conjunction with trusted binaries opens many possibilities for platforms to assess whether their peers are trustworthy. Detection of invalid attestations can trigger alarms or events, reduction of network access from a suspect device, or can become a part of Admission Control (e.g., IEEE 802.1X). Some platforms can be configured to support the unidirectional attestation mechanism.

Other freshness approaches can be based on trusted computing capabilities, such as TPM. For example, a token can be generated which allows external entities to validate freshness of asserted data based on the state of internal counters within the TPM. This token can be used to detect replay attacks, and provide attestation for asynchronous push, multicast, and broadcast messages.

Various of the foregoing approaches can be combined with TPM-integrated capabilities aimed at verifying that valid compute components, such as binary processes, are running on a node. These capabilities can include, for example, Trusted Execution Environments (TEE) which provide runtime malware protections, Authenticated Code Modules (ACM) which ensure that only digitally-signed code modules can be loaded into a processor, and the like. These technologies can validate that a processor is running known software with a valid chain of binary signatures.

In some cases, metadata elements, e.g. canary stamps, and tokens can be created by extracting current counters (e.g., clock, reset, restart) from a node's TPM, and incorporating such counters and security measures taken from the node into a packet. In some examples, the current counters and/or security measures can be hashed with information within an external TPM. The metadata elements and tokens can thereby provide a non-spoofable token or metadata element, which can bind continuously incrementing counters on an attestee with a known external state. Any resetting of the TPM counters is visible in any subsequent TPM queries, and any restarting of a platform is also exposed in subsequent TPM queries. Within these bounds of reset and restart, the TPM's time ticks counter continuously increments. Therefore, any push of attestee TPM information which includes these counters can be determined to have occurred subsequent to any previously-received measurement. Also, if the reset and restart counters have not changed, the incremental time since any previous measurement can also be known.

In some cases, a large amount of information that should be trusted by network peers may not be contained within the TPM's Program Configuration Registers (PCR). As a result, indirect methods of validating that a node has not been compromised can be applied.

The receipt of the metadata elements, e.g. canary stamps, and/or tokens can mean that a receiver should have the option of verifying the information. In many cases, such verification can be performed without the need of supplementary evidence being sent with the canary stamp. Moreover, in non-controller based or centralized implementations, the verification steps do not have to occur at the receiver.

In some integrity verification implementations, a controller or device can implement an integrity verification application. The integrity verification application can be designed to recognize change events and evaluate known good values, which allow evaluation of a boot-integrity stamp and a running process binary signature stamp based on, for example, TPM counters, timestamps, nonces, and/or time tokens. On any discrepancy, a controller or centralized device can isolate a compromised node from its network peers by shutting down the interfaces of the node.

In some examples, the metadata elements, e.g. canary stamps, and/or verifications for integrity can be implemented, such as a measured-boot stamp (e.g., SHA1 hash over PCRs 0-7), a verified-boot stamp (e.g., which can verify that only recognized binaries were executed when booting), a process-stamp (e.g., root-of-trust validated through a process which is asserting a particular protocol or protocols), a file-system stamp (e.g., all files within a vendor determined set of directories), a log-integrity stamp (e.g., used to augment existing integrity analytics and forensics), a configuration stamp (e.g., State of the current device configuration), etc. Some implementations can achieve all or some of these stamps, depending on the implementation. Moreover, in some implementations, all or some of these stamps can be implemented or achieved using a single or multiple stamps.

As previously explained, TPM provides methods for collecting and reporting the identity of hardware and software components in a platform to establish trust for that platform. TPM functionality can be embedded in a variety of devices including mobile phones, personal computers, network nodes (e.g., switches, routers, firewalls, servers, network appliances, etc.), and/or any other computing devices. Further, attestation can describe how the TPM can be used as a hardware root of trust and offer proof of integrity of a node. Such integrity can include hardware integrity, software integrity (e.g., micro loader, firmware, boot loader, kernel, operating system, binaries, files, etc.), and runtime integrity.

In some cases, TPM and attestation can be implemented as described herein to provide proof of integrity and proof of transit through uncompromised nodes. In some examples, metadata elements and tokens containing or reflecting security measures are used as previously mentioned to validate the integrity of a node and perform continuous evaluation of node integrity. Thus, the metadata elements and tokens described herein can be used to provide proof of transit through uncompromised nodes.

In some examples, the metadata elements and tokens can be added as additional metadata to packets that traverse a network where proof of transit via uncompromised nodes is desired. Various strategies can be implemented for transporting the metadata elements and tokens in a packet. In some cases, the metadata elements and tokens can be carried within an In-Situ (or in-band) Operations, Administration and Management (IOAM) data field.

In some implementations, the metadata elements and tokens can be carried with IOAM trace data. For example, a canary stamp can be carried as part of an IOAM data field in a variety of encapsulation protocols such as, for example and without limitation, IPv4, IPv6, NSH (Network Service Header), etc. In some cases, the canary stamp can be carried in an IOAM data field as an IOAM Trace option data element (e.g., with an IOAM Trace type for node integrity canary stamp). A metadata element, token, or digest, e.g. canary stamp digest, can be added in the IOAM trace option of a packet by each node that forwards the packet.

When the packet reaches a node (e.g., the destination node and/or an intermediate node) that removes IOAM metadata (e.g., an IOAM decapsulating node), the validity of the metadata element and/or token in the packet can be verified to determine that the packet traversed uncompromised nodes. In some examples, since canary stamps are time bound, the packet trace timestamps defined in IOAM can be used to validate the canary stamp in the time window the packet traversed that node.

Verification can be performed without placing a large transactional load on the verifier or a device, such as a controller, that will ultimately validate the security measurements associated with the metadata elements or tokens. This is because the measurement values can often change infrequently. The verifier may only need to validate a metadata element and/or token carried within an IOAM data trace whenever the associated security measurements associated change (e.g., a verifier may only need to check with a controller whenever it sees a node's TPM extends a PCR value which was not previously confirmed by the verifier).

In some cases, when only the time ticks within a signed metadata element increases, only the signature of the metadata element is validated. To do this, the verifier may use the public key of any node which can place a metadata element. Such signature validation can be done without using a controller to verify the measurements.

In another example, a packet can carry IOAM POT data with space optimization of metadata element values, e.g. canary stamp values. For example, a new IOAM POT data field can carry a canary stamp or a hash extend of a canary stamp and, in turn, canary stamp data can be carried across nodes. In some cases, a canary stamp hash extend can be a similar method as PCR extend operation performed by TPMs.

In some cases, the canary stamp hash can provide a one-way hash so that a canary stamp recorded by any node cannot be removed or modified without detection. IOAM proof of transit option data for a canary stamp digest can be defined by a hash algorithm (e.g., 20 octets with SHA1, 32 octets with SHA 256, etc.). In some implementations, each node along a path of the packet can forward the packet with a new or updated canary stamp digest. In some examples, the new or updated canary stamp digest can be generated by a node as follows: IOAM canary stamp digest new value=Digest of (IOAM canary stamp digest old value||hash (canary stamp of the node)), where the IOAM canary stamp digest old value can refer to the canary stamp digest included in the packet by one or more previous hops.

Moreover, in some cases, a Per Packet Nonce (PPN), where PPN changes per packet and is carried as another field within the IOAM metadata option, can be added to provide robustness against replay attacks. To illustrate, in some examples, a PPN can be added as follows: IOAM canary stamp digest new value=Digest of (IOAM canary stamp digest old value||hash(canary stamp of the node||PPN)). A node creating the new value for the IOAM canary stamp digest can thus take the value of any previous IOAM canary stamp digest and extend/hash that value with the node's current canary stamp. The result of the concatenation and hashing can then be written into IOAM POT data (or other IOAM data fields) as the new IOAM canary stamp digest.

At the verifier (e.g., the device verifying the canary stamp data), the same operation can be performed over expected canary stamp values calculated for the nodes that are traversed in the time window when the packet was forwarded. A verifier can be an inline device or a centralized device. Moreover, in some examples, nodes that are expected to be traversed can be identified using IOAM tracing, routing state or by sending active probes. A match between the value of POT data carrying specific metadata elements, e.g. a canary stamp digest and the expected canary stamp value, can prove that the packet traversed through trusted or uncompromised nodes.

In some examples, one or more strategies can be implemented to optimize metadata element validation. For example, metadata elements, e.g. canary stamps, can detect attempts of a replay attack by embedding a nonce as well as TPM or TPM2 counters (e.g., clock, reset, restart). In some cases, this nonce can be part of the metadata elements and different from the PPN described above.

The nonce is relevant to a receiver as the interval from the nonce's creation time to the first stamp received by the verifier can define the interval of freshness (e.g., the measurement is no older than this interval of freshness). From there, the TPM2 time ticks counter can be used to maintain that initial gap of freshness even without the delivery of a new nonce.

In some implementations, to optimize metadata element or token validation across nodes, the following approaches can be implemented to deliver synchronization information from a central component to each node and the verifier. For example, a central server can broadcast or multicast centralized nonce values (e.g., tracked random numbers). Each node can pick up the latest nonce and use it to attest a value. A verifier can know the freshness of a metadata element or token it receives from each node. This freshness can be the delta in time since that particular nonce was issued. Subsequent attestations can use the incrementing time ticks to prove freshness from that initial time gap. In some cases, the issuing of new nonces can reset the time gap to a potentially shorter interval.

Moreover, in some cases, each node can embed attested time within its metadata element. To get attested time, a TUDA (Time-Based Uni-Directional Attestation) scheme such as the TUDA scheme described in https://tools.ietf.org/id/draft-birkholz-i2nsf-tuda-01.html, the contents of which are incorporated herein by reference in their entirety, can be used. This can result in the availability of both the attested time at a node, as well as the value of the TPM2 counters at this node when a TUDA time-synchronization token was created. This can eliminate the use of a central nonce authority, but can increase the size of the metadata element as the nonce can be replaced by the TUDA time-synchronization token. This approach may also implement a central timestamp authority as per TUDA. In some examples, for each hop, a canary stamp digest value can be: IOAM canary stamp digest new value=Digest of (IOAM canary stamp digest old value||hash(canary stamp of the node||TUDA time-synchronization token of the node)).

This approach can provide numerous benefits. For example and without limitation, with this approach, a verifier can limit the number of verifications by verifying the signature of a hop's time-synchronization token only when it changes. Moreover, with this approach, there may not be a time gap nonce changeover freshness when a first measurement is received. Further, in some cases, this approach can be implemented without also carrying a PPN or without synchronizing a nonce across nodes as previously described.

Further, an attestor, e.g. a node or a verifier, can use random numbers, otherwise pseudo-random numbers, created by peers and/or the attestor to generate and verify attestation information. Specifically, the attestor can accumulate random numbers from one or more layer 2 peers. The random numbers can be accumulated from the peers over a specific amount of time, e.g. a short duration of time. In turn, the random numbers can be combined into a number through an applicable technique, e.g. a Bloom filter. This number can serve as a nonce for a cryptoprocessor for generating a result. As follows, the layer 2 peers, potentially including the attestor, can use the result created by the cryptoprocessor, to verify/validate that their corresponding provided random number was used in generating the nonce ultimately used by the cryptoprocessor to create the result. In turn, the layer 2 peers, potentially including the attestor, can generate verified attestation information based on the random numbers generated by the peers, the nonce created from the random numbers, and/or the result created by the cryptoprocessor from the nonce.

Having provided an initial discussion of example concepts and technologies for providing explicit verifiable proof of integrity of network nodes traversed by packets, the disclosure now turns to FIG. 1.

FIG. 1 is a block diagram of an example of networking environment 100 in accordance with some implementations. While pertinent features are shown, those of ordinary skill in the art will appreciate from the present disclosure that various other features have not been illustrated for the sake of brevity and so as not to obscure aspects of the example implementations disclosed herein.

In this example, the networking environment 100 can include a network 114 of interconnected nodes (e.g., 108A-N, 110A-N, and 112A-N). The network 114 can include a private network, such as a local area network (LAN), and/or a public network, such as a cloud network, a core network, and the like. In some implementations, the network 114 can also include one or more sub-networks, such as sub-network 114A. Sub-network 114A can include, for example and without limitation, a LAN, a virtual local area network (VLAN), a datacenter, a cloud network, a wide area network (WAN), etc. In some examples, the sub-network 114A can include a WAN, such as the Internet. In other examples, the sub-network 114A can include a combination of nodes included within a LAN, VLAN, and/or WAN.

The networking environment 100 can include a source node 102. The source node 102 can be a networking device (e.g., switch, router, gateway, endpoint, etc.) associated with a data packet that is destined for a destination node 116. The source node 102 can communicate with candidate next-hop nodes 108A-108N on the network 114. Each of the candidate next-hop nodes 108A-108N can be included within a respective route between the source node 102 and the destination node 116. Moreover, in some cases, each of the candidate next-hop nodes 108A-108N can communicate with candidate second hop nodes 110A-110N in the network 114. Each of the candidate second hop nodes 110A-110N can similarly communicate with candidate N-hop nodes 112A-112N in the network 114.

The networking environment 100 can also include an attestation routing orchestrator 104. The attestation routing orchestrator 104 can communicate with the candidate next-hop nodes 108A-108N. In some implementations, the attestation routing orchestrator 104 can obtain attestation data (e.g., canary stamps, security measures, signatures, and/or metadata) or vectors from the candidate next-hop nodes 108A-108N. In some examples, the attestation routing orchestrator 104 can obtain additional information from candidate second-hop nodes 110A-110N and/or candidate N-hop nodes 112A-112N and utilize the additional information in selecting a particular candidate next-hop node for a packet. In some implementations, the attestation routing orchestrator 104 can also obtain additional information from nodes that are more than two hops away (e.g., candidate third hop nodes, candidate fourth hop nodes, etc.).

The attestation routing orchestrator 104 can communicate with a verifier system 106. While, the verifier system 106 is conceptually shown as being implemented separate from the network 114, the verifier system 106 can be implemented within the network 114, e.g. as part of a network device in the network 114. In some implementations, the attestation routing orchestrator 104 can obtain trusted state, such as a trusted image vector, from the verifier system 106. The verifier system 106 can include a verified state repository 106A and one or more servers 106B. In some examples, the verified state in the verified state repository 106A can include one or more verified images, verified security measurements, verified settings, verified node data, and/or any other verified trust or integrity data. In some implementations, the verified state in the verified state repository 106A can include one or more trusted states or image vectors that are known with a degree of confidence to represent uncompromised states or images (e.g., states or images that have not been hacked, attacked, improperly accessed, etc.).

As will be described in great detail with reference to FIG. 4, in some cases, the attestation routing orchestrator 104 can select and direct a data packet to a particular candidate next-hop node of the candidate next-hop nodes 108A-108N based on a trusted state or image vector and the attestation states or vectors. Moreover, the attestation routing orchestrator 104 can direct the data packet destined for the destination node 116 to the particular candidate next-hop node.

Figure 2:
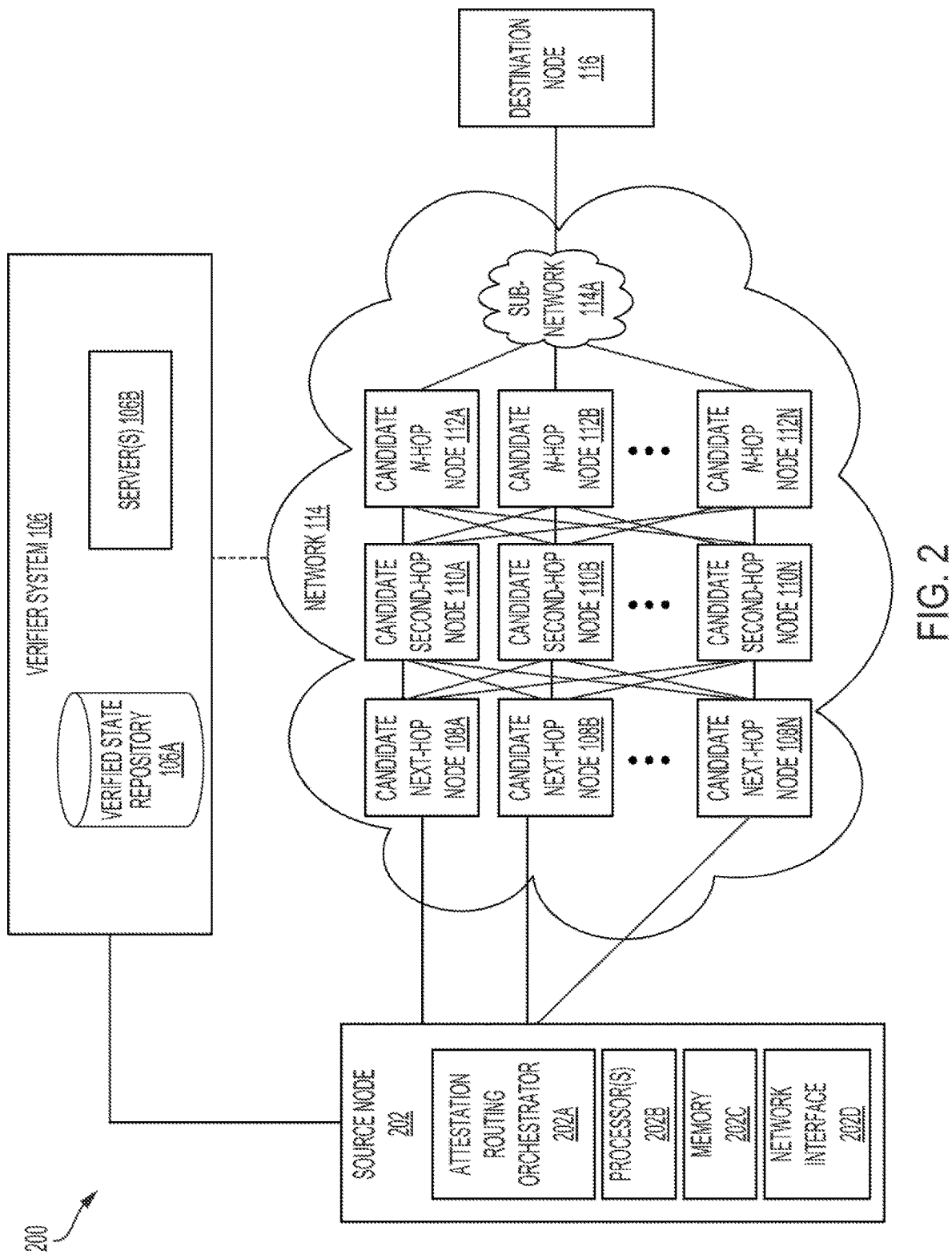

FIG. 2 is a block diagram of another example networking environment 200 in accordance with some implementations. In this example, the networking environment 200 includes a source node 202 that implements an attestation routing orchestrator 202A. In some implementations, the attestation routing orchestrator 202A can be similar to, or adapted from, the attestation routing orchestrator 104 in FIG. 1.

The source node 202 can include one or more processors 202B. In some implementations, the one or more processors 202B can provide processing resources for generating a confidence scores for the candidate next-hop nodes 108A-108N. In some implementations, the one or more processors 202B can provide processing resources for selecting a particular confidence score, from the confidence scores, that satisfies one or more selection criteria.

In some examples, the source node 202 can include a memory 202C. The memory 202C can be, for example and without limitation, a non-transitory memory, such as RAM (random-access memory), ROM (Read-only memory), etc. The memory 202C can store the data, such as the packet destined for the destination node 116. In some implementations, the memory 202C can store a trusted state or image vector obtained from the verifier system 106. In some implementations, the memory 202C can store attestation states or vectors obtained from the candidate next-hop nodes 108A-108N and optionally attestation states or vectors obtained from the candidate second hop nodes 110A-110N and/or the candidate N-hop nodes 112A-112N. The source node 202 can also include a network interface 202D for obtaining, receiving, and transmitting the data packets and states or vectors.

In some implementations, the source node 202 can select and direct a data packet to a particular candidate next-hop node based a trusted state or image vector and the attestation states or vectors.

Figure 3:
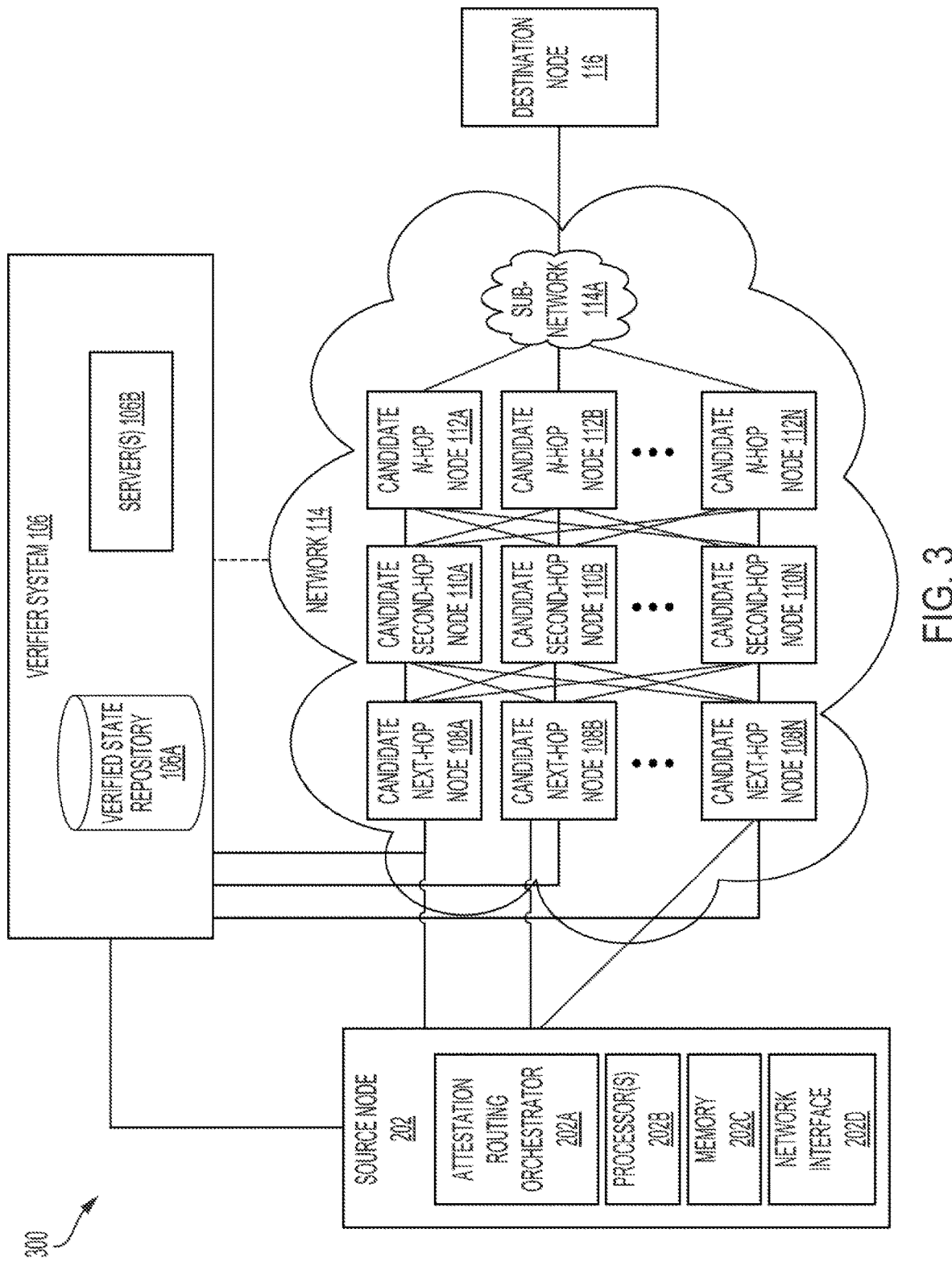

FIG. 3 is a block diagram of another example networking environment 300 in accordance with some implementations. In this example, one or more of the candidate next-hop nodes 108A-108N can relay a trusted state or image vector from the verifier system 106 to the source node 302. In some implementations, the attestation routing orchestrator 302A can be similar to, or adapted from, the attestation routing orchestrator 104 in FIG. 1 and/or the attestation routing orchestrator 202A in FIG. 2.

In some implementations, the verifier system 106 can sign the trusted state or image vector and provide the signed trusted state or image vector to a particular candidate next hop node, which in turn can provide the signed trusted state or image vector to the source node 302. In some implementations, having the particular candidate next hop node provide the signed trusted state or image vector can reduce attestation time (e.g., the time to determine trustworthiness of the particular candidate next hop node) because the source node 302 may not need to contact a remote node (verifier system 106). In some implementations, attestation time can be further reduced because a single attestation process (e.g., the verifier system 106 signing the trusted state or image vector) facilitates the attesting of multiple source nodes. In other words, trusted states or image vectors may not be generated and evaluated on a per source node basis.

Moreover, in implementations in which the source node 302 is not connected to the verifier system 106 (e.g., link down), obtaining the trusted state or image vector from the particular candidate next hop provides an alternative mechanism for node attestation. In some implementations, the verifier system 106 appends a time-stamped response to the trusted state or image vector as part of the signing process, which can be referred to as stapling. Consequently, the source node 302 may not contact the verifier system 106 in order to attest a particular candidate next hop node.

Figure 4:
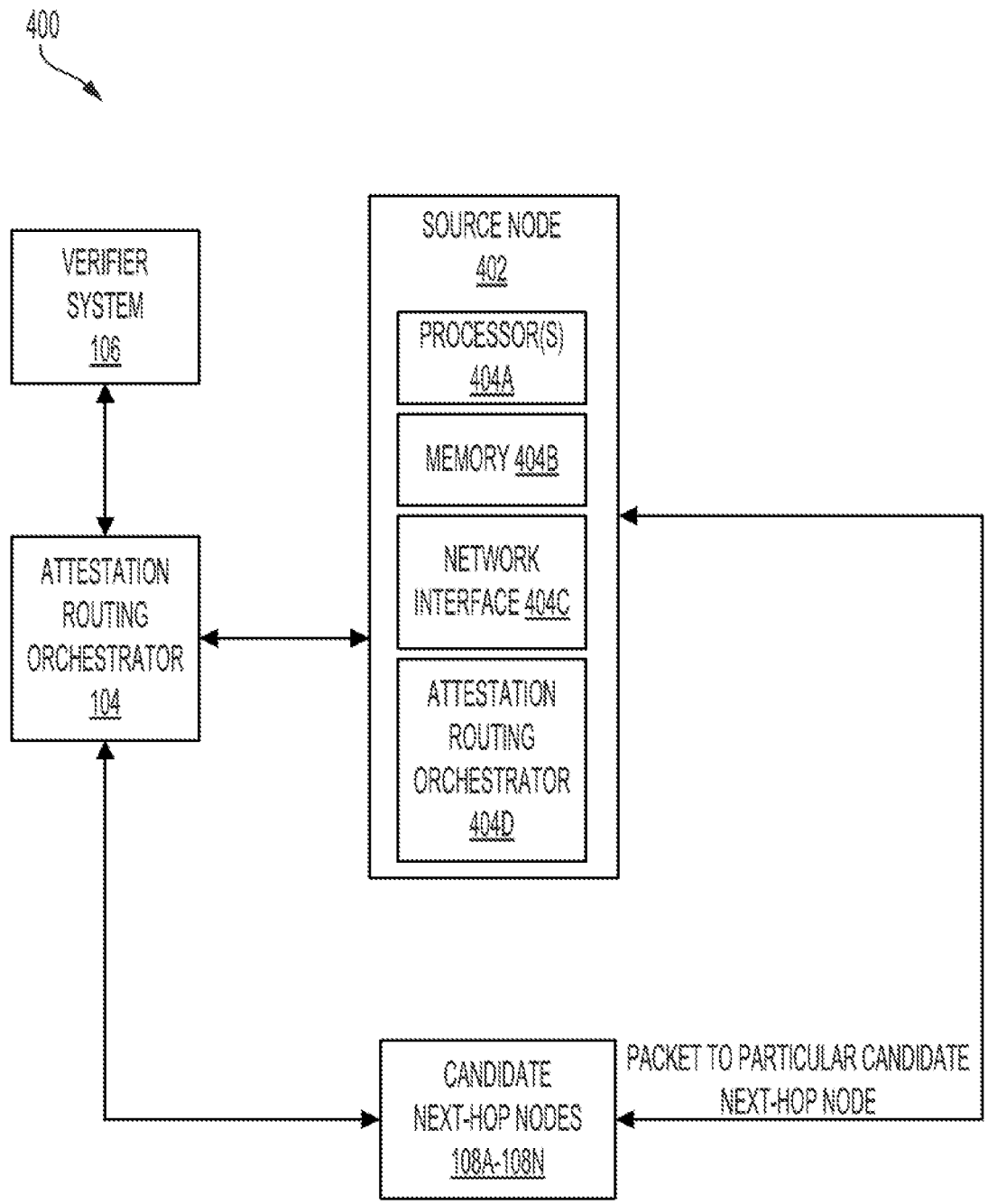
FIG. 4 illustrates an example of a controller orchestrated attestation-based routing, in accordance with some examples.

FIG. 4 is a block diagram of an example controller-orchestrated attestation-based routing 400, in accordance with some implementations. In some examples, the source node 402 is similar to, or adapted from, the source node 102 in FIG. 1. As illustrated in FIG. 4, the attestation routing orchestrator 104 is separate from, but coupled (e.g., connected) to, the source node 402. In some examples, the attestation routing orchestrator 104 can include a controller with knowledge of the network 114 that includes the candidate next-hop nodes 108A-N and optionally the candidate second-hop nodes 110A-N and/or the candidate N-hop nodes 112A-N.

For example, in some implementations, the attestation routing orchestrator 104 can be a network management system (NMS). As another example, in some implementations, the attestation routing orchestrator 104 can be an intent-based networking system, such as Cisco's Digital Network Architecture (DNA). As yet another example, in some implementations, the attestation routing orchestrator 104 can be a wireless LAN controller (WLC), and the candidate next-hop nodes 108A-108N and optionally the candidate second hop nodes 110A-N and/or the candidate N-hop nodes 112A-N can be networking devices such as access points, user devices, switches, routers, firewalls, etc.

The attestation routing orchestrator 104 can obtain attestation data (e.g., canary stamps) from the candidate next-hop nodes 108A-108N. Each of the candidate next-hop nodes 108A-108N can be included within a respective route between the source node 402 and a destination node (e.g., 114). In some implementations, the respective routes are independent of each other.

The attestation routing orchestrator 104 can determine confidence scores based on the attestation data. For example, in some cases, each of the confidence scores can be based on a comparison between a corresponding one of the attestation data and a trusted state or image vector. In some implementations, the attestation routing orchestrator 104 can obtain the trusted state or image vector from the verifier system 106.

In some examples, the attestation routing orchestrator 104 can obtain attestation data from candidate second-hop nodes (e.g., 110A-N) and/or candidate N-hop nodes (112A-N). Each of the candidate second-hop nodes and/or the candidate N-hop nodes can be included within a respective route between a corresponding one of the candidate next-hop nodes 108A-108N and the destination node. Moreover, each of the confidence scores can additionally be based on a comparison between a corresponding one of the attention data and the trusted state or image vector in combination with a comparison between another corresponding one of the attestation data from the candidate next-hop nodes 108A-N and the trusted state or image vector.

The attestation routing orchestrator 104 can select, from the confidence scores, a particular confidence score that satisfies one or more selection criteria. The particular confidence score is associated with a particular candidate next-hop node of the candidate next-hop nodes 108A-108N.

The attestation routing orchestrator 104 can directs, to the particular candidate next-hop node, a data packet destined for the destination node. For example, in some cases, the attestation routing orchestrator 104 can provide attested route information (e.g., validated canary stamp data, security measurements, etc.) to an attested route manager 404D of the source node 402 in order to facilitate the source node 402 sending the data packet to the particular candidate next-hop node. The attested route information can be indicative of the trustworthiness of each of the candidate next-hop nodes 108A-108N.

For example, in some implementations, the attested route information includes an identifier (e.g., an IP address, a MAC address, an SSID, etc.) identifying a secure candidate next-hop node of the candidate next-hop nodes 108A-108N. In this example, the source node 402 can provide the data packet based on the identifier in order to route the data packet to the secure, particular candidate next-hop node.

As another example, in some implementations, the attested route information can include confidence scores associated with the candidate next-hop nodes 108A-108N. In this example, the attested route manager 404D can select a particular candidate score based on one or more selection criteria. Moreover, the attested route manager 404D can provide the data packet to the particular next-hop node associated with the particular candidate score. In some examples, the attestation routing orchestrator 104 can cease to direct additional data packets to the particular candidate next-hop node in response to determining that the particular confidence score falls below a confidence threshold.

In some cases, the source node 402 can include one or more processors 404A. The one or more processors 404A can provide processing resources for managing attested route information obtained from the attestation routing orchestrator 104. The source node 402 can also include a memory 404B. The memory 404B can include, for example, a non-transitory memory such as RAM, ROM, etc. In some examples, the memory 404B can store data such as the obtained attested route information and data packets to be transmitted. The source node 402 can also include a network interface 404C for obtaining the attested route information and sending/receiving other data.

In some cases, whether a network device has been compromised can be determined based on indicators associated with the network device and time information. The indicators can include, but are not limited to, a set of security measurements or evidence footprints which indicate whether a particular device is compromised. Such indicators can come from one or more sources such as, for example and without limitation, TPM, canary stamps, Syslog, YANG Push, EEM, peer devices, traffic counters, and other sources. Visibility can be a method of identifying a compromise in a timely manner.

When there are no indicators (i.e., no security measurements or footprints available), the probability of a device being compromised can be a function of the time which has passed since a last validation that the device is in a known good state. In some cases, with the foregoing indicators, a formula can be provided for estimating probability or chance of a compromise on any given device operating within a network.

For example, $P\_v_1$ can be defined as a probability for compromise of type 1 when there is a specific set of events/signatures existing which correspond to the compromise. $P\_v_2$ can be defined as probability for compromise of type 2 and $P\_v_x$ can be defined as probability for compromise of type x. Assuming each of these compromises ($P\_v_1$ through $P\_v_x$) are independent, the following equation can provide the probability of a compromise based on recognized signatures ($P\_v$):

$$P\_v = 1-((1-P\_v_1)(1-P\_v_2)(1-P\_v_x)) \qquad \text{Equation (1).}$$

Other type of equations can be used instead of, or in conjunction with, equation (1) when there are interdependencies between different types of evaluated compromises ($P\_v_1$, $P\_v_2$, $P\_v_x$).

Furthermore, in some cases, a given probability (e.g., $P\_v_1$-$P\_v_x$) can be determined based on evidence of events from a device for which the probability of a compromise is being calculated (e.g., via equation (1)) and/or evidence obtained from one or more devices adjacent to the device for which the probability of a compromise is being calculated (e.g., via equation (1)).

In some cases, a probability that an invisible compromise has occurred at a device in the deployment environment can be expressed by the equation:

$$P_i = 1-((1\text{-chance of invisible compromise in time period } t)\textasciicircum\text{number of } t \text{ intervals since a last verification of a good/uncompromised system state}) \qquad \text{Equation (2).}$$

Effectively knowing $P_i$ can imply that an operator knows the half-life which should be expected before a device should be considered compromised independently of any concrete evidence. It should be noted that a probability of an invisible compromise does not have to be static. Real-time modification based on current knowledge of viruses/attacks may be allowed.

With formulates for visible and invisible factors as described above (equation (1) and equation (2)), an overall probability of a compromise for a given device may be given by:

$$P_c = 1-((1-P_v)*(1-P_i)) \qquad \text{Equation (3).}$$

Equation (3) provides an indicator of trustworthiness of a given device. This metric considers both time-based entropy and any available evidence which can be correlated to known compromises.

If $P_c$ can be calculated (or roughly estimated), various functions can be efficiently prioritized. For example, a controller may schedule when to do deeper validation (or perhaps direct refresh) of a device. This scheduling could include determining when to perform active checks to validate device memory locations (locations possibly containing executable code which might have been compromised). These can be used to return the system to a known good state (and reset the entropy timer). Local configuration repositories can be refreshed based on evidence of security/trustworthiness issues underway, rather than being based just on time. Beyond the scheduling of system checks, there can be forwarding implications based on the value of $P_c$. For example, routing or switching behavior might be adjusted/impacted based on the relative trustworthiness of a remote device. Where a higher $P_c$ values exist, sensitive data traffic flows can be routed around that device.

As a further advantage of the present disclosure, it should be noted that encryption alone may be insufficient to protect sensitive flows since there are scenarios where even the fact that a flow is occurring between endpoints might be considered information to be protected (e.g., in a battlefield).

As discussed previously, nodes communicating through NDP are subject to a variety of attacks. Further, an attack through NDP can subsequently enable more sophisticated denial-of-service (DoS) attacks and man-in-the-middle (MitM) attacks. However, there is a lack of available tools and techniques for verifying the integrity and trustworthiness of nodes communicating through NDP, e.g. for preventing attacks launched through NDP.

The present includes systems, methods, and computer-readable media for solving these problems/discrepancies.

Specifically, the present technology involves system, methods, and computer-readable media for verifying the trustworthiness of NDP nodes through attestation. Additionally, the present technology involves systems, methods, and computer-readable media for performing NDP-based attack mitigation if a node is identified as untrustworthy.

Figure 5:
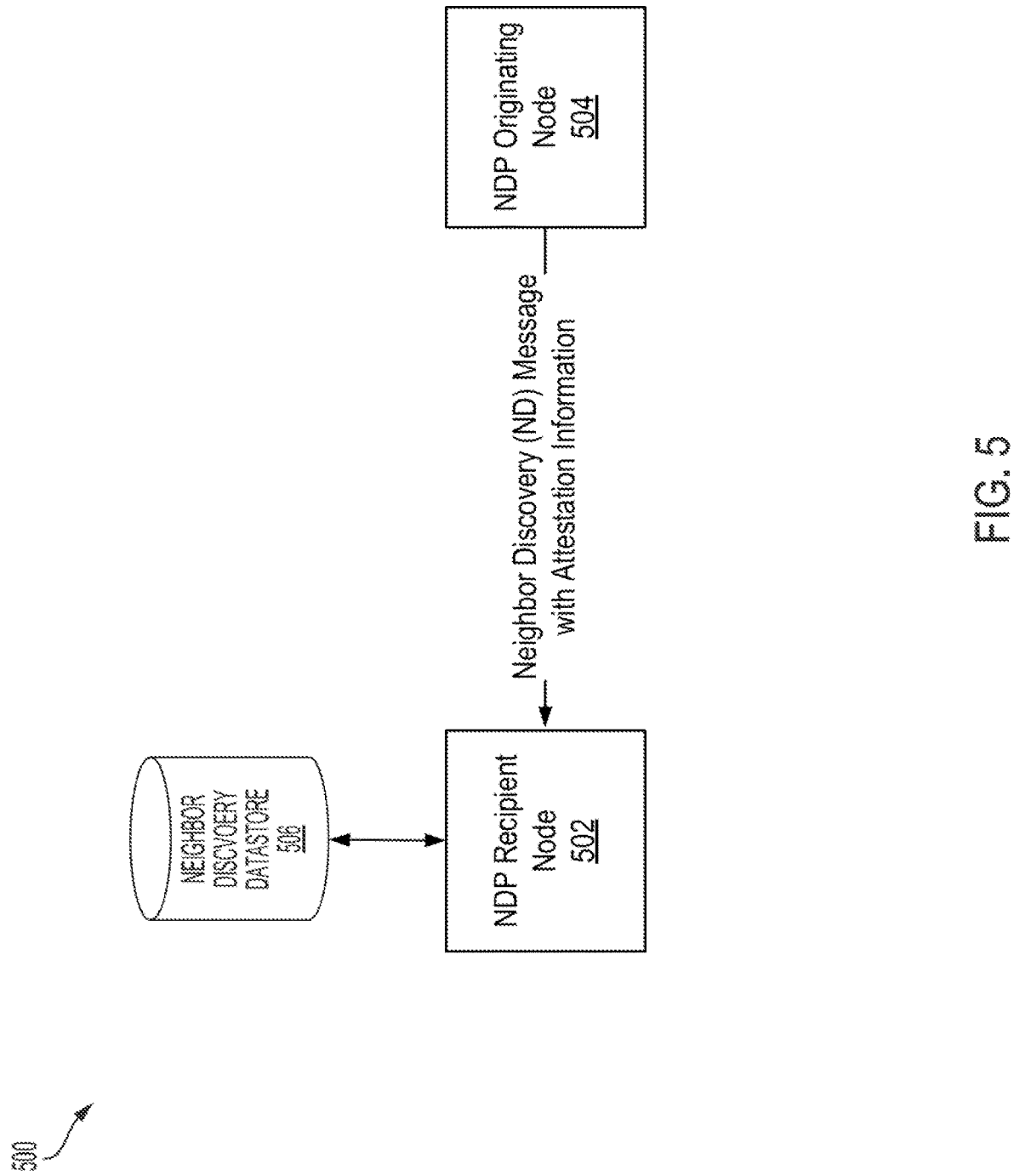
FIG. 5 illustrates an example network environment 500 for verifying NDP nodes through attestation.

FIG. 5 illustrates an example network environment 500 for verifying NDP nodes through attestation. An NDP node, as used herein includes an applicable node in a network environment communicating through NDP. For example, an NDP nodes can include hosts and routers in a network environment. Messages transmitted by NDP nodes through NDP can include router solicitation messages, router advertisement messages, neighbor solicitation messages, neighbor advertisement messages, and redirect messages. NDP nodes can communicate through NDP to perform applicable functions related to establishing and maintaining connections in a network environment. For example, NDP nodes can communicate through NDP to locate routers residing on attached links, discover address prefixes that are on-link for attached links, discover link parameters, perform address auto-configuration, perform address resolution, determine next-hop nodes for a destination, detect reachability of a neighboring node, detect duplicate addresses that are already in use, and perform packet redirection.

As used herein, verifying an NDP node, e.g. an originator node or a recipient node communicating through NDP, includes verifying the trustworthiness/integrity of the NDP node. For example, and as will be discussed in greater detail later, verifying an NDP node can include verifying the integrity of hardware and/or software associated with the node. Verifying an NDP node can include determining one or more trust/integrity levels or extents of the NDP node. In turn, the trustworthiness/integrity of the NDP node can be quantified or qualified with respect to the identified trust/integrity levels or extents. For example, trustworthiness of an NDP node can be quantified or qualified by comparing an identified trust level of the NDP node with threshold trust levels for NDP nodes in a network environment.

The techniques for verifying NDP nodes and/or performing NDP-based attack mitigation, as discussed with respect to the example network environment 500 shown in FIG. 5, can be implemented in an applicable network environment that uses NDP to control communications for establishing and maintaining connections. Specifically, the techniques described with respect to the network environment 500 shown in FIG. 5 can be implemented in an applicable IPv6 network environment. Further, the techniques for verifying NDP nodes and/or performing NDP-based attack mitigation, as discussed with respect to the example network environment 500 shown in FIG. 5, can be implemented in an applicable network environment for proving packet transit through uncompromised nodes, such as the example environments 100, 200, and 300 shown in FIGS. 1-3.

The example network environment 500 includes an NDP recipient node 502 and an NDP originating node 504. Both the NDP recipient node 502 and the NDP originating node 504 function as applicable nodes, e.g. routers or hosts, in a network environment. Specifically, the NDP recipient node 502 and the NDP originating node 504 can send and receive data as part of accessing network services and/or providing access to network services through the network environment 500. The NDP recipient node 502 can be a host in the network environment 500 and the NDP originating node 504 can be a router in the network environment 500. Conversely, the NDP recipient node 502 can be a router in the network environment 500 and the NDP originating node 504 can be a host in the network environment 500.

The NDP recipient node 502 and the NDP originating node 504 can exchange data according to NDP for purposes of establishing and maintaining connections in the network environment 500. Specifically, the NDP recipient node 502 and the NDP originating node 504 can exchange data according to NDP for purposes of establishing and maintaining connections with the NDP recipient node 502 through the network environment 500. More specifically, the NDP recipient node 502 and the NDP originating node 504 can exchange data according to NDP for purposes of establishing and maintaining one or more connections between the NDP recipient node 502 and the NDP originating node 504 through the network environment 500.

In the example network environment 500, the NDP recipient node 502 receives a neighbor discovery (ND) message from the NDP originating node 504 as part of the NDP recipient node 502 and the NDP originating node 504 communicating according to NDP. While the NDP recipient node 502 is shown to only receive a single ND message, in various implementations, the NDP recipient node 502 can receive a plurality of different ND messages from the NDP originating node 504. Further, the NDP recipient node 502 can also send one or more ND messages to the NDP originating node 504 as part of the NDP recipient node 502 and the NDP originating node 504 communicating through NDP.

The ND message received at the NDP recipient node 502 from the NDP originating node 504 can include an applicable message transmitted according to NDP. Specifically, the ND message can be a router solicitation message, a router advertisement message, a neighbor solicitation message, a neighbor advertisement message, and a redirect message. For example, the ND message can be a universal router advertisement. As follows, the ND message can be transmitted by the NDP originating node 504 and received at the NDP recipient node 502 for an applicable purpose of communicating according to NDP. For example, the ND message can be transmitted by the NDP originating node 504 and received at the NDP recipient node 502 as part of locating routers residing on attached links, discovering address prefixes that are on-link for attached links, discovering link parameters, performing address auto-configuration, performing address resolution, determining next-hop nodes for a destination, detecting reachability of a neighboring node, detecting duplicate addresses that are already in use, and performing packet redirection. For example, the ND message can be transmitted by the NDP originating node 504 as part of the NDP recipient node 502 resolving a link layer address of the NDP originating node 504.

The NDP originating node 504 can transmit the NDP recipient node 502 in response to a message that is transmitted from the NDP recipient node 502 to the NDP originating node 504, e.g. in accordance with NDP. For example, the NDP originating node 504 can transmit a router advertisement message to the NDP recipient node 502 in response to a router solicitation message sent from the NDP recipient node 502 to the NDP originating node 504. In another example, the NDP originating node 504 can transmit a neighbor advertisement message to the NDP recipient node 502 in response to a neighbor solicitation message sent from the NDP recipient node 502 to the NDP originating node 504.

The NDP originating node 504 can add or otherwise include attestation information of the NDP originating node 504 in the ND message that is sent to the NDP recipient node 502. The attestation information can be generated by the NDP originating node 504 itself. Further and as will be discussed in greater detail later, the attestation information can be generated by the NDP originating node 504 functioning with a verifier. The attestation information can be generated using an applicable technique for generating data used in verifying the trustworthiness of a device/node, e.g. using the previously described attestation techniques. For example, the attestation information can be generated using a TPM and/or stamps, e.g. Canary stamps.

Attestation information, as used herein, includes applicable data for verifying the trustworthiness of a device/node. Specifically, attestation information can include the previously described information used in verifying integrity of a node in a network environment. For example, attestation information can include PCR values for verifying integrity of a node in a network environment. The attestation information in the ND message generated by the NDP originating node 504 can include information for verifying trustworthiness of software executed at the NDP originating node 504. For example, the attestation information can include an indicator/metadata elements signifying that measurements of software executing at the NDP originating node 504 have been verified as expected measurements of software executing at the NDP originating node 504. Further, the attestation information in the ND message can include information for verifying the trustworthiness of hardware of the NDP originating node 504. For example, the attestation information in the ND message can include an indicator/metadata elements signifying that the hardware integrity of the NDP originating node 504 has been verified.

The trustworthiness of the NDP originating node 504 can be verified using the ND message, e.g. using the attestation information included in the ND message, received at the NDP recipient node 502 from the NDP originating node 504. Specifically, the trustworthiness of the NDP originating node 504 can be verified based on the attestation information included in the ND message using an applicable technique for verifying trustworthiness of nodes and devices based on attestation information, such as the previously described techniques. As will be discussed in greater detail later, the trustworthiness of the NDP originating node 504 can be verified by the NDP recipient node 502 based on the attestation information included in the ND message. Further and as will be discussed in greater detail later, the trustworthiness of the NDP originating node 504 can be verified based on the attestation information by both the NDP recipient node 502 and a verifier functioning together.

Connectivity with the NDP recipient node 502 through the network environment 500 can be managed, at least in part, based on the identified trustworthiness of the NDP originating node 504. In particular, connectivity between the NDP originating node 504 and the NDP recipient node 502 can be managed, at least in part, based on the identified trustworthiness of the NDP originating node 504. Specifically, if the NDP originating node 504 is verified as trustworthy, then the NDP recipient node 502 can use the ND message to establish and maintain connectivity in the network environment 500, e.g. through the NDP originating node 504. For example, if the NDP originating node 504 is verified as trustworthy, then the NDP recipient node 502 can resolve a link layer address of the NDP originating node 504 using the ND message, as part of forming a connection with the NDP originating node 504. Alternatively, if the NDP originating node 504 is verified as untrustworthy, then the NDP recipient node 502 can disregard the ND message as part of establishing and maintaining connectivity in the network environment 500.

For example, if the NDP originating node 504 is verified as untrustworthy, then the NDP recipient node 502 can abstain from forming a connection with the NDP originating node 504 using the ND message.

The NDP recipient node 502 can extract a link layer address and an internet layer address of the NDP originating node 504 from the ND message, e.g. as part of performing address resolution. In turn, if the trustworthiness of the NDP originating node 504 is verified, then the NDP recipient node 502 can perform applicable actions for facilitating communication between the NDP recipient node 502 and the NDP originating node 504 based on the extracted link layer address. Specifically, if the trustworthiness of the NDP originating node 504 is verified, then the NDP recipient node 502 can add an entry including a mapping of the link layer address to the internet layer address, e.g. as part of a neighbor discovery table, in a neighbor discovery datastore 506. Alternatively, if the NDP originating node 504 is verified as untrustworthy, the NDP recipient node 502 can still add an entry including a mapping of the link layer address to the internet layer address in the neighbor discovery datastore 506. In turn, nodes in the network environment 500, e.g. the NDP recipient node 502, can use the mapping of the link layer address to the internet layer address in the neighbor discovery datastore 506 to communicate with the NDP originating node 504 in the network environment 500.

The neighbor discovery datastore 506 can include applicable information for establishing and maintaining connections in the network environment 500. For example and as discussed previously, the neighbor discovery datastore 506 can include resolved link layer addresses of nodes in the network environment 500 that are discovered through messages communicated according to NDP. The neighbor discovery datastore 506 can be maintained by one or more applicable nodes in the network environment 500. Further, the neighbor discovery datastore 506 can be maintained at an applicable location in the network environment 500. For example, entries in the neighbor discovery datastore 506 can be maintained by the NDP recipient node 502 as part of a cache residing at the NDP recipient node 502. In another example, the neighbor discovery datastore 506 can be maintained remote from the NDP recipient node 502, e.g. in a cloud environment.

The data in the neighbor discovery datastore 506, e.g. an IPv6 neighbor table, can be included as part of protected configuration information of one or more nodes in the network environment 500. Specifically, the data in the neighbor discovery datastore 506 can be maintained as part of the protected configuration information of either or both the NDP recipient node 502 and the NDP originating node 504.

Entries in the neighbor discovery datastore 506 can be associated with a specific timeout length. A timeout length can specify an amount of time that an entry in the neighbor discovery datastore 506 is valid. In turn, the entries in the neighbor discovery datastore 506 can be maintained based on the timeout lengths associated with the entries. For example, if a timeout length of an entry has expired, then the entry can be removed from the neighbor discovery datastore 506. Entries in the neighbor discovery datastore 506 can be associated with varying timeout lengths. For example, a first entry can have a timeout length of one week, while a second entry can have a timeout length of four hours. Timeout lengths of entries in the neighbor discovery datastore 506 can vary based on nodes/devices associated with the entries. Specifically, timeout lengths of the entries in the neighbor discovery datastore 506 can vary based on verified trustworthiness of the nodes/devices associated with the entries, e.g. using attestation information received in ND messages from the nodes/devices. For example, if the NDP originating node 504 is not verified based on the attestation information, then an entry for the NDP originating node 504 can have a shorter timeout length, e.g. with respect to an entry of a verified node. Conversely, if the NDP originating node 504 is verified based on the attestation information, then an entry for the NDP originating node 504 can have a longer timeout length, e.g. with respect to an entry of an unverified node.

NDP-based attack mitigation can be performed if the trustworthiness of the NDP originating node 504 is not verified based on the received attestation data. Specifically, NDP-based attack mitigation can be performed if the NDP originating node 504 is verified as untrustworthy based on attestation information included in the ND message received from the NDP originating node 504. Specifically, NDP-based attack mitigation can be performed to mitigate effects of an NDP-based attack carried out by the NDP originating node 504 in the event that the NDP originating node 504 is actually a spoofer. In turn, this can mitigate or otherwise eliminate more sophisticated DoS attacks and MitM attacks that are facilitated through an NDP-based attack. NDP-based attack mitigation can be performed when the NDP originating node 504 is not verified as trustworthy and when the NDP originating node 504 is not actually malicious. This can further help to preserve security, with respect to NDP susceptibility, in the network environment 500.

NDP-based attack mitigation can include applicable actions taken to mitigate or otherwise eliminate harmful effects if an NDP-based attack is actually carried out in the network environment 500. Specifically, NDP-based attack mitigation can include refraining from adding entries of unverified devices into the neighbor discovery datastore 506. More specifically, if the NDP originating node 504 is not verified based on the attestation information, then the NDP recipient node 502 can refrain from adding a mapping of the link layer address and the internet layer address of the NDP originating node 504 to the neighbor discovery datastore 506. Alternatively, NDP-based attack mitigation can include varying timeout lengths of entries in the neighbor discovery datastore 506 based on whether a corresponding node is verified or is not verified. For example, if the NDP originating node 504 is not verified, then the NDP recipient node 502 can set a shortened timeout length for an entry of the NDP originating node 504 in the neighbor discovery datastore 506.

Additionally, NDP-based attack mitigation can include sending an alert indicating that an node has failed verification based on provided attestation information. Specifically, if the NDP originating node 504 is proved to be untrustworthy based on the provided attestation information, then an alert can be sent indicating that the NDP originating node 504 failed verification. An alert indicating that a node was verified as untrustworthy can be sent to an applicable entity associated with the network environment 500. For example, an alert indicating that the NDP originating node 504 is verified as untrustworthy can be sent to a network administrator of the network environment 500. In another example, an alert indicating that the NDP originating node 504 is verified as untrustworthy can be sent to neighboring nodes/hosts in the network environment 500. In turn, the entity that receives the alert can act based on the alert to mitigate an impact of an NDP-based attack. For example, a network administrator can prevent the NDP originating node 504 from accessing the network environment 500 in response to the received alert.

Further, NDP-based attack mitigation can include maintaining a log entry indicating that node has failed verification based on provided attestation information. The log entry can be included as part of a log of events associated with NDP in the network environment 500. Specifically, the log entry can be included as part of a log of NDP nodes that are verified as untrustworthy in the network environment 500. The log entry can include the link layer address of the NDP originating node 504 in the ND message. Additionally, the log entry can include a time at which the NDP originating node 504 provided the ND message.

Figure 6:
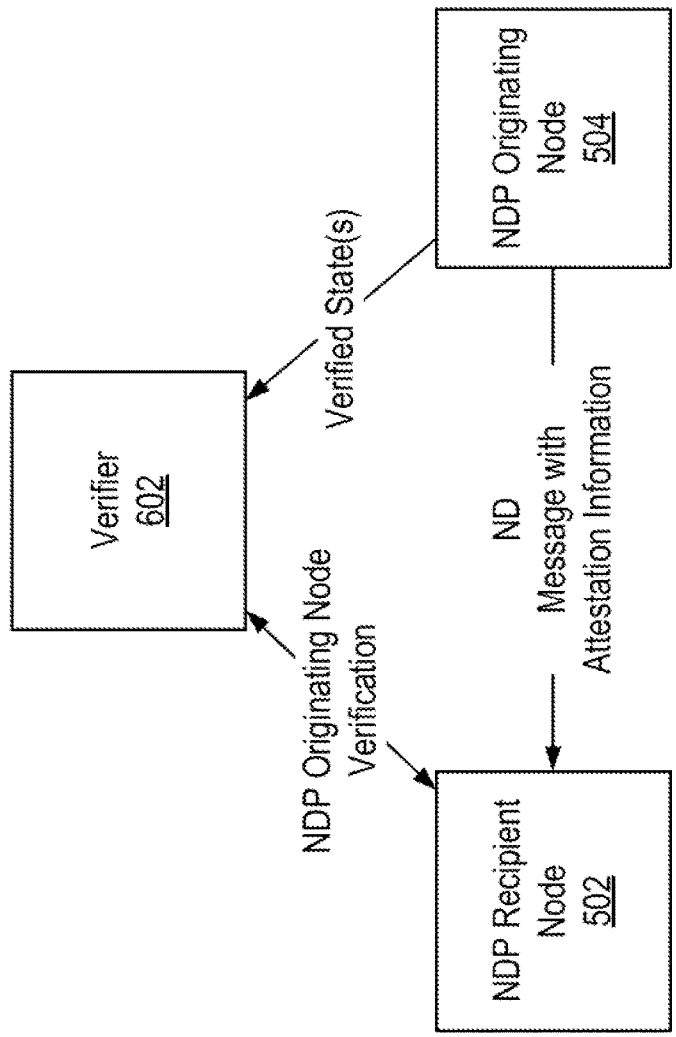
FIG. 6 illustrates an example operational configuration of the network environment 500 for verifying NDP nodes based on attestation information.

FIG. 6 illustrates an example operational configuration of the network environment 500 for verifying NDP nodes based on attestation information. The network environment 500 includes a verifier 602. The verifier 602 functions according to an applicable system for validating data associated with a node in a network environment for verifying the trustworthiness of the node, such as the verifier system 106 described herein. Specifically, the verifier 602 can maintain or otherwise have access to verified states of nodes in the network environment 500 for purposes of verifying the trustworthiness of the nodes. As discussed previously, a verified state can include one or more verified images, verified security measurements, verified settings, verified node data, and/or any other verified trust or integrity data for verifying the trustworthiness of a node.

In the example operational configuration of the network environment 500 shown in FIG. 5, the NDP originating node 504 can provide attestation information to the verifier 602. The attestation information provided to the verifier 602 by the NDP originating node 504 can include data for identifying one or more verified states of the NDP originating node 504. Specifically, the attestation information provided to the verifier 602 by the NDP originating node 504 can include measurements of the NDP originating node 504 that are verified to form one or more verified images, verified security measurements, verified settings, verified node data, and/or any other verified trust or integrity data for verifying the trustworthiness of the NDP originating node 504.

The NDP originating node 504, as described previously, can provide the attestation information to the NDP recipient node 502 as part of an ND message. The NDP recipient node 502 can then communicate with the verifier 602 to validate the trustworthiness of the NDP originating node 504 using the received attestation information. As follows, NDP-based attack mitigation can be performed according to any of the previously described techniques based on whether the NDP originating node 504 is verified as trustworthy using the attestation information.

In communicating with the verifier 602 to validate the trustworthiness of the NDP originating node 504, the NDP recipient node 502 can provide the received attestation information to the verifier 602. The verifier 602 can then remotely verify the trustworthiness of the NDP originating node 504 using the attestation information received from the NDP recipient node 502. Specifically, the verifier 602 can compare verified states of the NDP originating node 504, e.g. as received from the NDP originating node 504, with the attestation information of the NDP originating node 504 that is received from the NDP recipient node 502. Based on the comparison between the verified states and the attestation information of the NDP originating node 504, the verifier 602 can either verify the NDP originating node 504 as trustworthy or untrustworthy. More specifically, the NDP recipient node 502 can effectively verify the trustworthiness of the NDP originating node 504 through the verifier 602 based on the attestation information.

Figure 7:
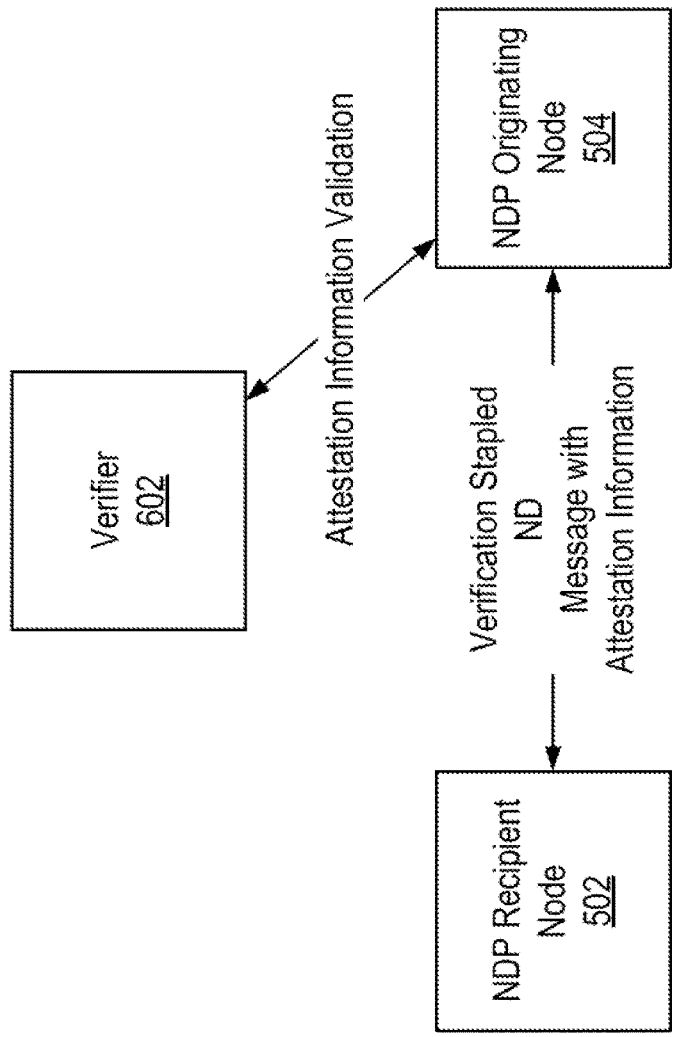
FIG. 7 illustrates another example operational configuration of the network environment 500 for verifying NDP nodes based on attestation information.

FIG. 7 illustrates another example operational configuration of the network environment 500 for verifying NDP nodes based on attestation information. In the example configuration shown in FIG. 7, the NDP originating node 504 can communicate with the verifier 602 to validate attestation information before it is sent to the NDP recipient node 502 as part of an ND message. Specifically, the NDP originating node 504 can send the attestation information to the verifier 602 and the verifier 602 can either validate or invalidate the attestation information. For example, the verifier 602 can validate or invalidate the attestation information by comparing the attestation information with verified states of the NDP originating node 504. If the verifier 602 validates the attestation information, then the verifier can provide an indicator of the validity of the attestation information back to the NDP originating node 504. For example, the verifier 602 can provide a verifier signed key for the attestation information back to the NDP originating node 504.

The NDP originating node 504 can staple the attestation information with the indicator of the validity of the attestation information provided by the verifier 602 in the ND message. For example, the NDP originating node 504 can staple the attestation information with the verifier signed key. In turn, the NDP originating node 504 can provide the ND message including the stapled attestation information, e.g. stapled with the verifier signed key, to the NDP recipient node 502.

The NDP recipient node 502 can then verify the trustworthiness of the NDP originating node 504 based on the stapled ND message. Specifically, as the ND message is already stapled with the indicator of the validity of the attestation information, e.g. the verifier signed key, the NDP recipient node 502 can trust that the provided attestation information is valid. More specifically, the NDP recipient node 502 can trust that the provided attestation information is valid without communicating with the verifier 602 to validate the attestation information. In turn, the NDP recipient node 502 can locally verify that the NDP originating node 504 is trustworthy, without communicating with the verifier 602. This can save time and computational resources, as the step of the NDP recipient node 502 communicating with the verifier 602 to validate the attestation information, as shown in the example operational configuration of the network environment 500 shown in FIG. 6, can be skipped. Further, this is advantageous as the NDP recipient node 502 can verify the NDP originating node 504 when the NDP recipient node 502 is unable to communicate with the verifier 602. Specifically, the NDP recipient node 502 can effectively perform the function of the verifier 602 by verifying the signature of the verifier included stapled ND message without actually communicating with the verifier 602.

In the example operational configuration shown in FIG. 7, the NDP originating node 504 can communicate with the verifier 602 to validate the attestation information as the attestation information is generated for the NDP originating node 504. Further, the NDP originating node 504 can communicate with the verifier 602 to validate the attestation information before a communication, e.g. NDP communication, is received at the NDP originating node 504 from the NDP recipient node 502. By validating the attestation information before a communication is received at the NDP originating node 504 from the NDP recipient node 502, the amount of time between when the NDP originating node 504 receives the communication from the NDP recipient node 502 and sends the ND message back to the NDP recipient node 502 can be reduced. This can improve overall performance within the network environment 500.

The indicator of the validity of the attestation information, e.g. the verifier signed key, can be associated with a validity time frame. Specifically, the verifier 602 can create a verifier signed key that is valid for a specific amount of time. As follows, the NDP recipient node 502 can verify the NDP originating node 504 based on the indicator of the validity of the attestation information if the validity time frame of the indicator is still active, e.g. the indicator has not expired. If the validity time frame of the indicator has expired, then the NDP recipient node 502 can attempt to validate the attestation information by communicating directly with the verifier 602.

While the disclosure has described the NDP recipient node 502 verifying the trustworthiness of the NDP originating node 504, the techniques and operational configurations described herein can be used to verify the trustworthiness of the NDP recipient node 502. Specifically, the trustworthiness of the NDP recipient node 502 can be verified from the perspective of the NDP originating node 504 based on attestation information associated with the NDP recipient node 502. In turn, applicable actions can be taken, e.g. by the NDP originating node 504, based on whether the NDP recipient node 502 is verified as trustworthy.

The NDP recipient node 502 can be verified based on attestation information included in an ND message sent to the NDP originating node 504. In turn, the NDP originating node 504 and/or the verifier 602 can verify the trustworthiness of the NDP recipient node 502 using the attestation information included in the ND message sent by the NDP recipient node 502.

Applicable NDP-based attack mitigation techniques can be performed, e.g. by the NDP originating node 504, based on whether the NDP recipient 502 is verified as trustworthy or untrustworthy. Specifically, the NDP originating node 504 can ignore the ND message sent from the NDP recipient node 502, if the NDP recipient 502 is verified as untrustworthy. Further, if the NDP recipient 502 is verified as untrustworthy, then the NDP originating node 504 can institute techniques to avoid attacks, e.g. packet level attacks, made by the NDP recipient node 502. For example, the NDP originating node 504 can implement one or more filters that filter packets received from the NDP recipient node 502 if the NDP originating node 504 is verified as untrustworthy.

Alternatively, if the NDP recipient node 502 is verified as trustworthy based on attestation information included in the ND message, then the NDP originating node 504 can function appropriately, e.g. as part of performing address resolution through NDP. Specifically, if the NDP recipient node 502 is verified as trustworthy, then the NDP originating node 504 can proceed with generating and sending uthe ND message with the attestation information of the NDP originating node 504. In turn, the attestation information of the NDP originating node 504 that is included in the ND message can be used to verify the trustworthiness of the NDP originating node 504.

While the disclosure has been discussed with respect to NDP, the techniques described herein can also be applied for verifying the trustworthiness of nodes communicating through the Inverse Neighbor Discovery Protocol (IND). Specifically, a node can verify the trustworthiness of a peer node communicating with the node according to IND using the techniques described herein. As follows, connectivity with the node, e.g. through the peer node, can be managed based on whether the peer node is verified as trustworthy based on communications with the peer node made according to IND.

The disclosure now turns to FIGS. 8 and 9, which illustrate example network nodes and computing devices, such as switches, routers, client devices, endpoints, servers, and so forth.

FIG. 8 illustrates an example network device 800 suitable for performing switching, routing, and other networking operations. Network device 800 includes a central processing unit (CPU) 804, interfaces 802, and a connection 810 (e.g., a PCI bus). When acting under the control of appropriate software or firmware, the CPU 804 is responsible for executing packet management, error detection, and/or routing functions. The CPU 804 can accomplish these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 8 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC) 812, which can be configured to perform routing and/or switching operations. The ASIC 812 can communicate with other components in the network device 800 via the connection 810, to exchange data and signals and coordinate various types of operations by the network device 800, such as routing, switching, and/or data storage operations, for example.

FIG. 9 illustrates a computing system architecture 900 including various components in electrical communication with each other using a connection 906, such as a bus. Example system architecture 900 includes a processing unit (CPU or processor) 904 and a system connection 906 that couples various system components including the system memory 920, such as read only memory (ROM) 918 and random access memory (RAM) 916, to the processor 904. The system architecture 900 can include a cache 902 of high-speed memory connected directly with, in close proximity to, or integrated as part of the processor 904. The system architecture 900 can copy data from the memory 920 and/or the storage device 908 to the cache 902 for quick access by the processor 904. In this way, the cache can provide a performance boost that avoids processor 904 delays while waiting for data. These and other modules can control or be configured to control the processor 904 to perform various actions.

Other system memory 920 may be available for use as well. The memory 920 can include multiple different types of memory with different performance characteristics. The processor 904 can include any general purpose processor and a hardware or software service, such as service 1 910, service 2 912, and service 3 914 stored in storage device 908, configured to control the processor 904 as well as a special-purpose processor where software instructions are incorporated into the actual processor design. The processor 904 may be a completely self-contained computing system, containing multiple cores or processors, a bus, memory controller, cache, etc. A multi-core processor may be symmetric or asymmetric.

To enable user interaction with the computing system architecture 900, an input device 922 can represent any number of input mechanisms, such as a microphone for speech, a touch-sensitive screen for gesture or graphical input, keyboard, mouse, motion input, speech and so forth. An output device 924 can also be one or more of a number of output mechanisms known to those of skill in the art. In some instances, multimodal systems can enable a user to provide multiple types of input to communicate with the computing system architecture 900. The communications interface 926 can generally govern and manage the user input and system output. There is no restriction on operating on any particular hardware arrangement and therefore the basic features here may easily be substituted for improved hardware or firmware arrangements as they are developed.

Storage device 908 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 916, read only memory (ROM) 918, and hybrids thereof.

The storage device 908 can include services 910, 912, 914 for controlling the processor 904. Other hardware or software modules are contemplated. The storage device 908 can be connected to the system connection 906. In one aspect, a hardware module that performs a particular function can include the software component stored in a computer-readable medium in connection with the necessary hardware components, such as the processor 904, connection 906, output device 924, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   generating a Neighbor Discovery (ND) message at an originating node in a network environment implementing a ND Protocol, wherein the ND message includes attestation information includes metadata signed by the originating node, the ND message including a link layer address and an internet layer address of the originating node;
   sending the ND message to a recipient node that is implementing the ND Protocol in the network environment for identifying trustworthiness of the originating node based on the metadata signed by the originating node to manage connectivity between the recipient node and the originating node;
   storing in a database, for a period of time, a map of the link layer address and an internet layer address, the period of time being a first amount of time when the originating node is not verified by the recipient node, and the period of time being a second amount of time when the originating node is verified by the recipient node, the first amount of time being shorter than the second amount; and
   removing the map when the period of time expires.

2. The method of claim 1, wherein the attestation information includes one or more security measurements as part of the metadata signed by the originating node and the trustworthiness of the originating node is identified, at least in part, based on the one or more security measurements.

3. The method of claim 1, wherein the trustworthiness of the originating node is identified by recognizing a level of trust of the originating node based on the metadata signed by the originating node and the connectivity between the recipient node and the originating node is managed based on the level of trust of the originating node.

4. The method of claim 1, wherein the recipient node, as part of managing the connectivity with the recipient node, is configured to disregard the ND message if the originating node is verified as untrustworthy based on an identified level of trust of the originating node.

5. The method of claim 1, wherein the recipient node, as part of managing the connectivity with the recipient node, is configured to either or both establish and maintain a connection in the network environment between the recipient node and the originating node based on the ND message if the originating node is verified as trustworthy based on an identified level of trust of the originating node.

6. The method of claim 1, wherein the ND message is either a router advertisement message or a neighbor advertisement message transmitted according to the Neighbor Discovery Protocol.

7. The method of claim 1, wherein the ND message is transmitted by the originating node in response to either a router solicitation message or a neighbor solicitation message transmitted from the recipient node to the originating node according to the ND Protocol.

8. The method of claim 1, wherein the attestation information of the originating node included in the ND message is sent from the recipient node to a verifier that is configured to remotely identify the trustworthiness of the originating node using the attestation information.

9. The method of claim 1, further comprising:
stapling, by the originating node, the attestation information included in the ND message with a verifier signed key, wherein the verifier signed key is generated based on a verifier validating the attestation information; and
sending the ND message including the attestation information with the verifier signed key from the originating node to the recipient node, wherein the recipient node is configured to locally verify the originating node using the attestation information and the verifier signed key received in the ND message.

10. A system comprising:
one or more processors; and
a computer-readable medium comprising instructions stored therein, which when executed by the one or more processors, cause the one or more processors to perform operations comprising:
generate a Neighbor Discovery (ND) message at an originating node in a network environment implementing a ND Protocol, wherein the ND message includes attestation information includes metadata signed by the originating node, the ND message including a link layer address and an internet layer address of the originating node;
send the ND message to a recipient node that is implementing the ND Protocol in the network environment for identifying trustworthiness of the originating node based on the metadata signed by the originating node to manage connectivity between the recipient node and the originating node;
storing in a database, for a period of time, a map of the link layer address and an internet layer address, the period of time being a first amount of time when the originating node is not verified by the recipient node, and the period of time being a second amount of time when the originating node is verified by the recipient node, the first amount of time being shorter than the second amount; and
removing the map when the period of time expires.

11. The system of claim 10, wherein the attestation information includes one or more security measurements as part of the metadata signed by the originating node and the trustworthiness of the originating node is identified, at least in part, based on the one or more security measurements.

12. The system of claim 10, wherein the trustworthiness of the originating node is identified by recognizing a level of trust of the originating node based on the metadata signed by the originating node and the connectivity between the recipient node and the originating node is managed based on the level of trust of the originating node.

13. The system of claim 10, wherein the recipient node, as part of managing the connectivity with the recipient node, is configured to disregard the ND message if the originating node is verified as untrustworthy based on an identified level of trust of the originating node.

14. The system of claim 10, wherein the recipient node, as part of managing the connectivity with the recipient node, is configured to either or both establish and maintain a connection in the network environment between the recipient node and the originating node based on the ND message if the originating node is verified as trustworthy based on an identified level of trust of the originating node.

15. The system of claim 10, wherein the ND message is either a router advertisement message or a neighbor advertisement message transmitted according to the ND Protocol.

16. The system of claim 10, wherein the ND message is transmitted by the originating node in response to either a router solicitation message or a neighbor solicitation message transmitted from the recipient node to the originating node according to the ND Protocol.

17. The system of claim 10, wherein the attestation information of the originating node included in the ND message is sent from the recipient node to a verifier that is configured to remotely identify the trustworthiness of the originating node using the attestation information.

18. The system of claim 10, wherein the operations further comprise:
staple, by the originating node, the attestation information included in the ND message with a verifier signed key, wherein the verifier signed key is generated based on a verifier validating the attestation information; and
send the ND message including the attestation information with the verifier signed key from the originating node to the recipient node, wherein the recipient node is configured to locally verify the originating node using the attestation information and the verifier signed key received in the ND message.

19. A non-transitory computer-readable storage medium comprising instructions stored therein, which when executed by one or more processors, cause the one or more processors to perform operations comprising:
generate a Neighbor Discovery (ND) message at an originating node in a network environment implementing a ND Protocol, wherein the ND message includes attestation information includes metadata signed by the originating node, the ND message including a link layer address and an internet layer address of the originating node;
send the ND message to a recipient node that is implementing the ND Protocol in the network environment for identifying trustworthiness of the originating node based on the metadata signed by the originating node to manage connectivity between the recipient node and the originating node;
storing in a database, for a period of time, a map of the link layer address and an internet layer address, the period of time being a first amount of time when the originating node is not verified by the recipient node, and the period of time being a second amount of time when the originating node is verified by the recipient node, the first amount of time being shorter than the second amount; and
removing the map when the period of time expires.

20. The non-transitory computer-readable storage medium of claim 19, wherein the attestation information includes one or more security measurements as part of the metadata signed by the originating node and the trustworthiness of the originating node is identified, at least in part, based on the one or more security measurements.

* * * * *